(12) United States Patent
Rayl et al.

(10) Patent No.: US 6,976,694 B1
(45) Date of Patent: Dec. 20, 2005

(54) TRAILER HITCH INCLUDING V-GUIDE

(76) Inventors: Kevin G. Rayl, 5795 County Rd. 15, Bluffton, OH (US) 45817; Rodney D. Rayl, 1661 County Rd. 20, Ada, OH (US) 45810

( * ) Notice: Subject to any disclaimer, the term of this patent is extended or adjusted under 35 U.S.C. 154(b) by 0 days.

(21) Appl. No.: 10/894,923

(22) Filed: Jul. 20, 2004

(51) Int. Cl.[7] ................................. B60D 1/36
(52) U.S. Cl. .................................... 280/477
(58) Field of Search ............... 280/477, 504, 280/511

(56) References Cited

U.S. PATENT DOCUMENTS

| | | | |
|---|---|---|---|
| 3,420,549 A | * | 1/1969 | Robinson ............. 280/477 |
| 4,871,185 A | * | 10/1989 | Chakroff et al. ....... 280/477 |
| 5,236,215 A | * | 8/1993 | Wylie ................. 280/477 |
| 5,779,256 A | * | 7/1998 | Vass .................. 280/477 |
| 5,797,616 A | * | 8/1998 | Clement .............. 280/477 |
| 5,941,551 A | | 8/1999 | Harman et al. | 
| 6,182,997 B1 | | 2/2001 | Ullrich et al. |
| 6,698,783 B1 | | 3/2004 | Zechbauer |
| 2004/0032112 A1 | * | 2/2004 | Reese et al. ......... 280/477 |

OTHER PUBLICATIONS

"EZ-Hitch, Bill Dance & EZ-Workhorse Products" home page found at www.ezhitch.biz/home on Jul. 26, 2004.

* cited by examiner

*Primary Examiner*—Kevin Hurley
(74) *Attorney, Agent, or Firm*—John A. Miller; Warn, Hoffmann, Miller & LaLone, P.C.

(57) ABSTRACT

A hitch assembly that includes a V-guide for directing a trailer tongue to a hitch ball on the hitch assembly so as to align a trailer tongue cup to the hitch ball. The hitch assembly includes guide wings pivotally mounted to a hitch post. When the guide wings are in the V-guide position, slideable rods on the guide wings are positioned behind the post to prevent the wings from pivoting. When the trailer is attached to the vehicle, the slideable rods are retracted so that the guide wings can pivot to a retracted position where the rods are slid into openings in the hitch post.

20 Claims, 3 Drawing Sheets

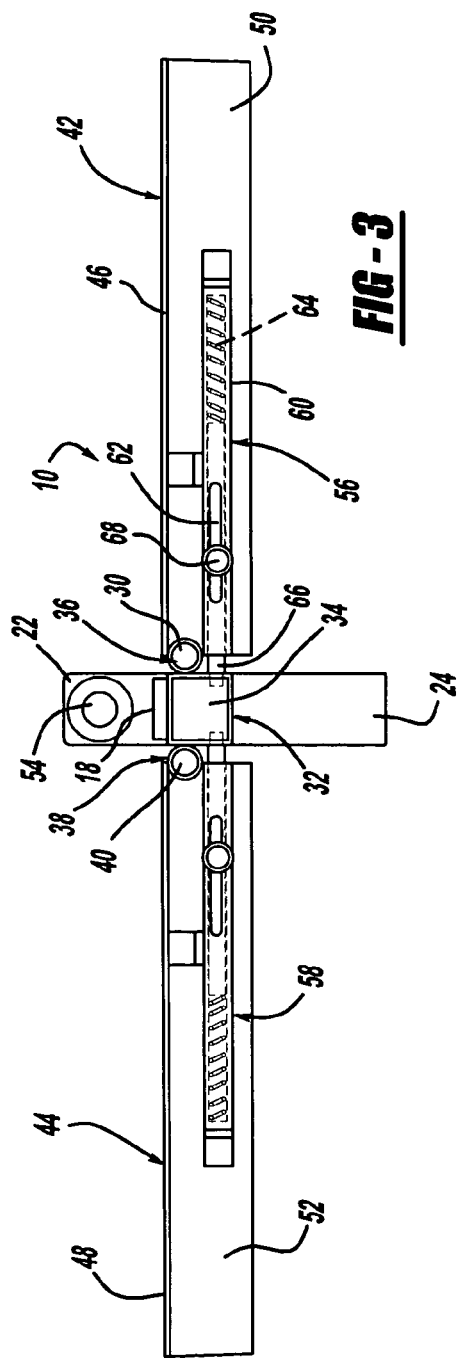
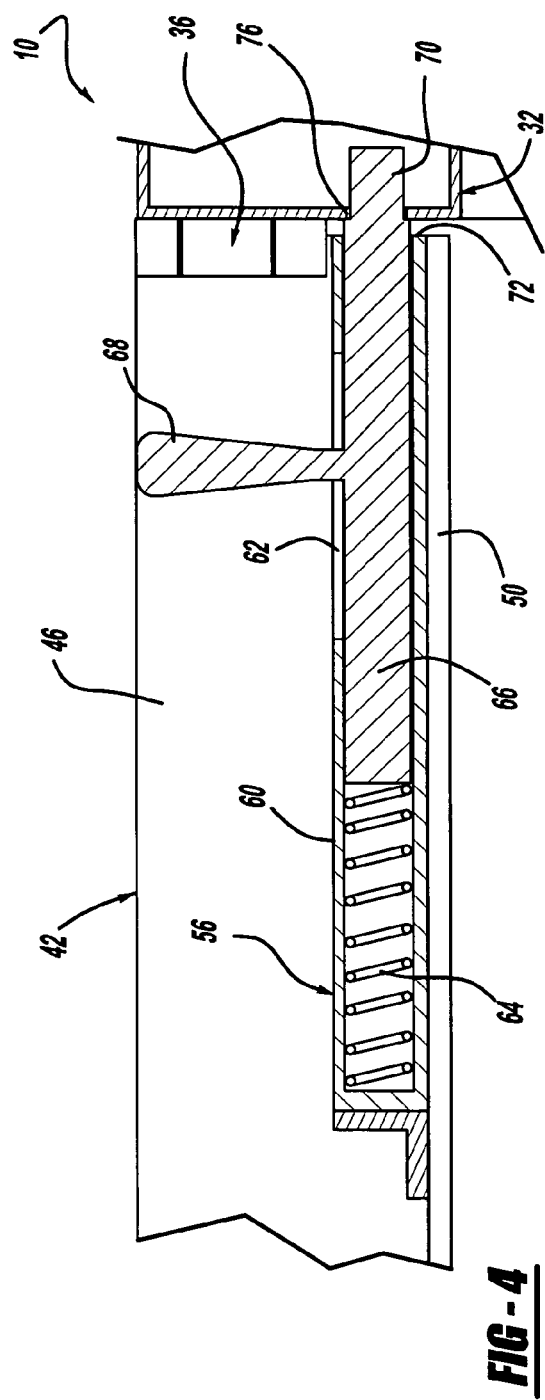

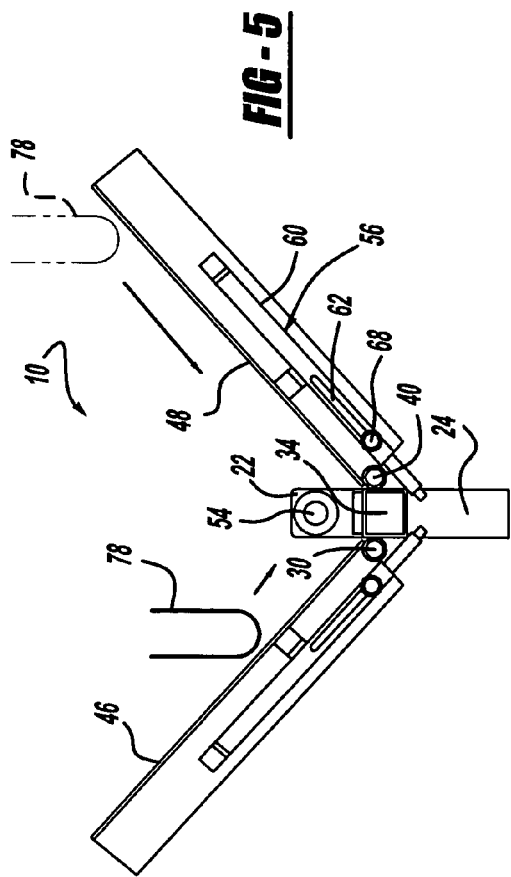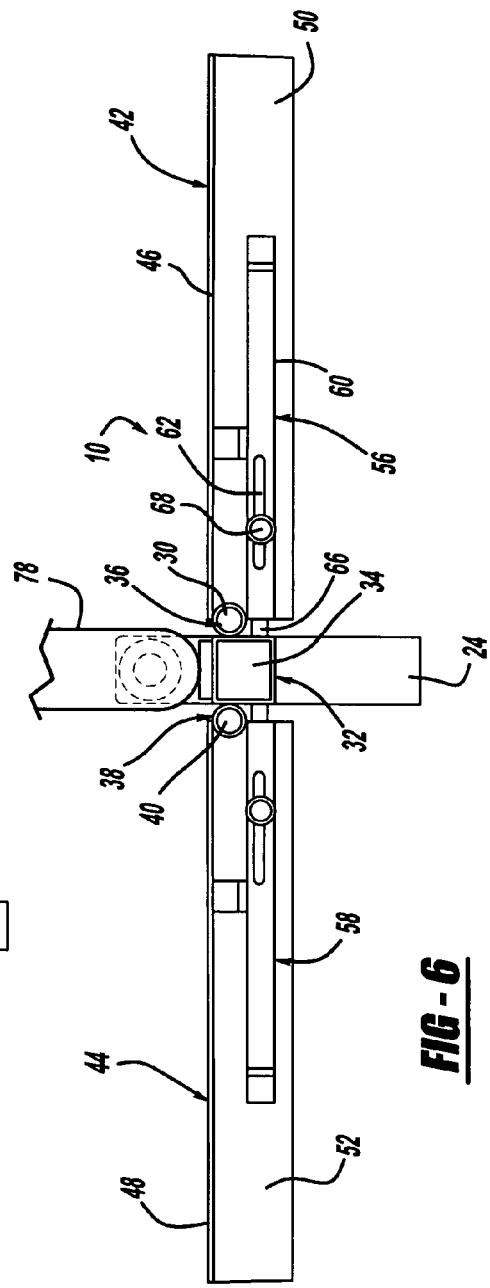

TRAILER HITCH INCLUDING V-GUIDE

BACKGROUND OF THE INVENTION

1. Field of the Invention

This invention relates generally to a trailer hitch and, more particularly, to a trailer hitch that includes a V-guide for directing a trailer tongue into alignment with a ball on the hitch.

2. Discussion of the Related Art

As is well understood in the art, some vehicles are equipped with a towing hitch that allows a trailer or other towed vehicle to be coupled thereto so that the towing vehicle can tow the trailer. Generally, the trailer hitch is mounted to a rear support structure of the towing vehicle proximate the vehicle's bumper, and includes a hitch ball having a certain diameter. The towed vehicle typically includes a trailer tongue that extends from a front end of the towed vehicle. The trailer tongue includes a cup in which the hitch ball is positioned to couple the hitch to the trailer tongue. A securing mechanism within the cup, such as a metal flap, is selectively positioned around the ball when it is inserted in the cup to securely hold the tongue to the hitch.

When the towed vehicle is detached from the towing vehicle, the trailer tongue is generally supported on an adjustable front leg or stand so that the cup is positioned higher than the ball of the hitch. When the operator of the towing vehicle attaches the tongue to the hitch, he will back up the towing vehicle to position the hitch ball just below the cup. Once in this position, the tongue is lowered onto the ball by cranking down the stand using a jack device.

Generally it takes a significant amount of experience and skill for the vehicle operator to accurately position the hitch ball below the tongue cup when backing up the towing vehicle to connect the towed vehicle to the towing vehicle. Regardless of the operator's skill and experience, it is nearly impossible to exactly position the hitch ball at the proper location. Therefore, the operator usually must use the trailer tongue to manually move the towed vehicle in a right or left or front or back direction to provide the exact alignment. Because the towed vehicle may be large, heavy and cumbersome to move, this is sometimes a very difficult task.

It would be desirable to provide a hitch that assisted the towing vehicle operator to align the tongue cup to the hitch ball when attaching a towed vehicle to a towing vehicle.

SUMMARY OF THE INVENTION

In accordance with the teachings of the present invention, a hitch assembly is disclosed that employs a V-guide for directing a trailer tongue to a hitch ball on the hitch assembly so as to align a trailer tongue cup to the hitch ball. The hitch assembly includes a mounting tube that is slidably engageable within a hitch receiver mounted to the towing vehicle. A pin is inserted through aligned openings in the hitch receiver and the mounting tube to secure the hitch assembly to the vehicle. The hitch assembly further includes a hitch post that extends vertically from a hitch base plate. Hinges are mounted to opposite sides of the hitch post. A first guide wing is mounted to one hinge and a second guide wing is mounted to the other hinge so that the guide wings are pivotally mounted to the post. A first slide mechanism is mounted to the first guide wing and a second slide mechanism is mounted to the second guide wing.

When the operator of the towing vehicle couples the vehicle to the tongue of a towed vehicle, the wings are put in a V-guide position where ends of retractable rods within the slide mechanisms are positioned behind the post opposite to the hitch ball. When the vehicle operator backs up the vehicle, the trailer tongue will contact one or the other of the guide wings, and the tongue will be pushed towards the hitch post to be aligned with the hitch ball. The guide wings are prevented from pivoting on the hinges from the force of the trailer tongue by the retractable rods. Once the trailer tongue is aligned with the hitch ball, the vehicle operator secures the trailer tongue to the hitch ball and moves the rods to a retracted position where the guide wings are pivoted to a parallel position relative to the rear bumper of the towing vehicle. An inner end of the rods are inserted into openings in the hitch post to maintain the guide wings in the retracted position. Therefore, the guide wings do not interfere with the trailer when the vehicle is turned.

Additional advantages and features of the present invention will become apparent from the following description and appended claims, taken in conjunction with the accompanying drawings.

BRIEF DESCRIPTION OF THE DRAWINGS

FIG. 3 is a top view of the hitch assembly shown in FIG. 1 removed from the vehicle, where the V-guide is in a retracted position;

FIG. 4 is a cut-away, cross-sectional view of one of the slide mechanisms of the hitch assembly of the invention;

FIG. 5 is a top view of the hitch assembly of the invention in a V-guide position with a trailer tongue shown in a hitching position; and FIG. 6 is a top view of the hitch assembly of the invention in a retracted position with a trailer tongue shown in a hitched position.

DETAILED DESCRIPTION OF THE EMBODIMENTS

The following description of the embodiments of the invention directed to a hitch assembly including a V-guide is merely exemplary in nature, and is in no way intended to limit the invention or its applications or uses.

Figure 1:
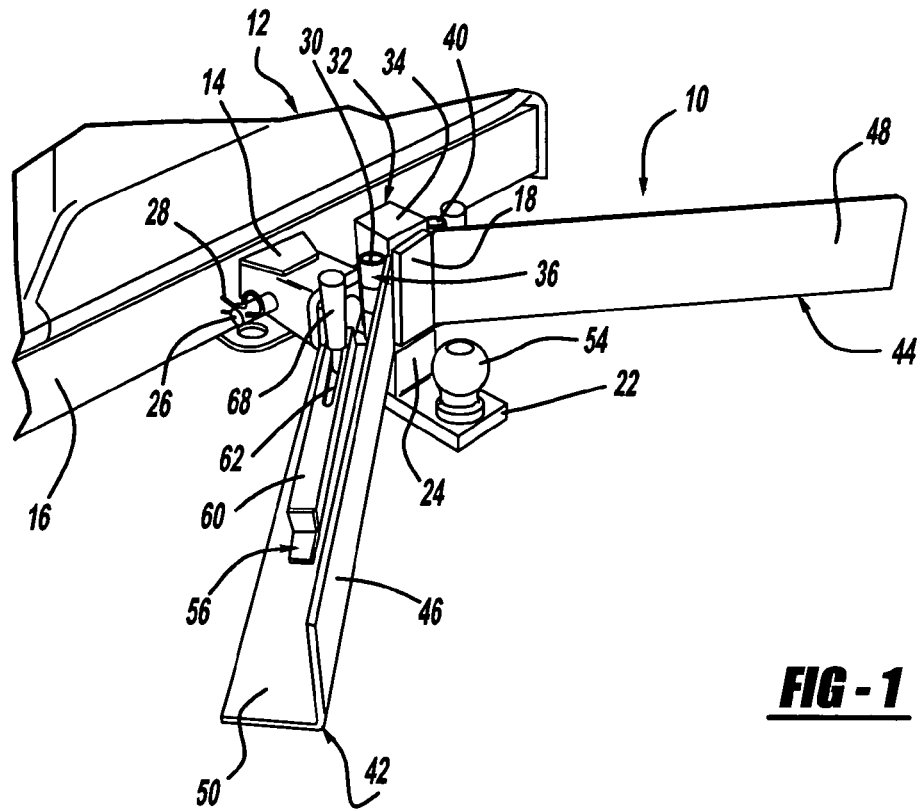
FIG. 1 is an isometric view of a trailer hitch assembly including a V-guide mounted to a vehicle, according to one embodiment of the present invention.
Figure 2:
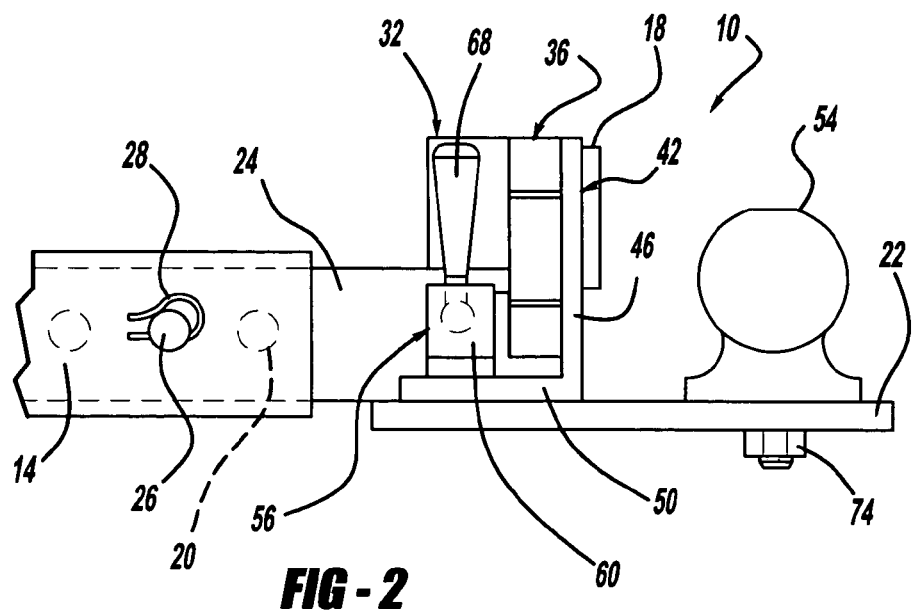
FIG. 2 is a side view of the hitch assembly shown in FIG. 1 mounted to the vehicle.

FIG. 1 is an isometric view of a hitch assembly 10, according to an embodiment of the present invention, secured to a towing vehicle 12 shown in cut-away. FIG. 2 is a side view of the hitch assembly 10 secured to the vehicle 12 and FIG. 3 is a top view of the hitch assembly 10 separated from the vehicle 12. As will be discussed in detail below, the hitch assembly 10 is in a hitching V-guide position for attaching a towed vehicle to the towing vehicle 12 in FIG. 1, and is in a retracted position in FIGS. 2 and 3. The vehicle 12 includes a standard hitch receiver 14 mounted to a suitable support structure 16 on the vehicle 12, as would be well understood to those skilled in the art. The hitch receiver 14 is a square steel tube, and may have any one of a variety of suitable diameters and sizes, such as a 2" diameter.

The hitch assembly 10 includes a base plate 22 made of, for example, a suitable thickness steel. A square mounting tube 24 is welded to the base plate 22, and is sized and shaped to snugly fit within the hitch receiver 14. In one embodiment, the mounting tube 24 is made of 1018 tube steel and has side lengths of about 2 inches. The mounting tube 24 includes aligned openings 20 extending through walls of the tube 24 that align with corresponding openings in the walls of the hitch receiver 14. A metal rod 26 is inserted through the openings 20 in the mounting tube 24 and the openings in the hitch receiver 14 to hold the hitch assembly 10 to the hitch receiver 14. A cotter pin 28 is secured to the rod 26 in the normal manner to prevent the rod 26 from sliding out of the openings. A series of the openings 20 can be provided along the length of the mounting tube 24, so that the hitch assembly 10 can be mounted to the hitch receiver 14 at different locations. Therefore, the hitch assembly 10 can be selectively positoned at different distances from the back of the vehicle 12, and can accommodate vehicles having different styles and positions of hitch receivers.

The hitch assembly 10 further includes a hitch post 32 welded on top of the mounting tube 24, as shown. The post 32 is also a square steel tube, and includes an end cap 34 made of a suitable material, such as steel, nylon or plastic. The hitch assembly 10 further includes a first guide wing 42 and a second guide wing 44. The guide wings 42 and 44 include a front plate 46 and 48, respectively, and a base plate 50 and 52, respectively, so that the guide wings 42 and 44 have an L-shape. In one non-limiting embodiment, the front plates 46 and 48 are about four inches high and the base plates 50 and 52 are about two inches wide. Further, the guide wings 42 and 44 are about 17 inches long. In this design, outer ends of the guide wings 42 and 44 are about two feet apart when the wings 42 and 44 are in the V-guide position. In one embodiment, the guide wings 42 and 44 are made from a suitable piece of steel that is bent to provide the L-shape.

One half of a hinge 36 is rigidly mounted to one side of the hitch post 32 and one half of a hinge 38 is rigidly mounted to an opposite side of the hitch post 32 by any suitable technique, such as welding. An opposing half of the hinge 36 is rigidly mounted to an inside end of the front plate 46 of the first guide wing 42 and an opposing half of the hinge 38 is rigidly mounted to an inside end of the front plate 48 of the second guide wing 44 by any suitable technique, such as welding. The hinge 36 includes a hinge pin 30 and the hinge 38 includes a hinge pin 40 that pivotally secure the hinge halves together so that the first and second guide wings 42 and 44 are pivotally mounted to the hitch post 32. In one non-limiting example, the hinge pins 30 and 40 are ⅝ diameter hinge pins.

A hitch ball 54 is secured to the base plate 22 adjacent to the hitch post 32 and opposite to the hitch receiver 14. In one embodiment, the hitch ball 54 is secured to the base plate 22 by a bolt 74 so that the hitch ball 54 can be removed and replaced with other hitch balls so that different size hitch balls can be used in combination with the hitch assembly 10 for different hitch types. Standard hitch balls typically are available in 1⅞, 2 and 2 5/16 inch diameter sizes. In one embodiment, the distance between the hitch post 32 and the center of the hitch ball 54 is set up for the 2 5/16 inch size hitch ball. The hitch assembly 10 can include a removable spacer 18 mounted to a wall of the hitch post 32 adjacent to the hitch ball 54 for the 1⅞ and 2 inch size hitch ball, where the spacer 18 has the appropriate thickness. The spacer 18 allows a trailer tongue to be properly aligned with the hitch ball 54 when a front edge of the tongue contacts the hitch post 32 for reasons that will become more apparent from the discussion below. The spacer 18 can be made of steel and can be mounted to the hitch post 32 by a suitable technique, such as by bolts.

A first slide mechanism 56 is secured to the base plate 50 and a second slide mechanism 58 is secured to the base plate 52 by, for example, welding as shown. FIG. 4 is a cut-away, cross-sectional view of the slide mechanism 56 in the retracted position. The slide mechanism 56 includes a square steel tube 60 including a slot 62. In one non-limiting example, the tube 60 is about 9 inches long and the slot 62 is about three quarters of an inch wide. A spring 64 is positioned within the tube 60 at one end, and a rod 66 is positioned within the tube 60 adjacent to the spring 64, as shown. A handle 68 is rigidly mounted to the rod 66, and extends through the slot 62, as shown. A narrowed diameter end 70 of the rod 66 extends out of an end 72 of the tube 60. A shoulder between the narrowed end 70 and the rest of the rod 66 is pushed against an outer surface of a wall of the hitch post 32 when the hitch assembly 10 is in the retracted position. In one non-limiting example, the rod 66 and the handle 68 are made of steel, and are welded together. The slide mechanism 58 is identical to the sliding mechanism 56.

FIG. 1 shows the guide wings 42 and 44 in the hitching V-guide position. FIG. 5 illustrates how the V-guide position assists the towing vehicle operator to align a trailer tongue 78 to the hitch ball 54. When the hitch assembly 10 is in the hitching V-guide position, the spring 64 pushes the rod 66 so that the end 70 extends behind the hitch post 32, as shown. The handle 68 contacts an end of the slot 62 so that the end 70 can be positioned at the desired location. In other words, the length of the slot 62, the length of the spring 64 and the length of the rod 66 are all calibrated so that the end 70 of the rod 66 is positioned behind the hitch post 32 a desirable distance. When the vehicle operator backs up the towing vehicle, the tongue 78 contacts one of the front plates 46 or 48. The particular guide wing 42 or 44 that is hit causes the trailer tongue 78, and thus the trailer, to be directed towards the hitch ball 54. The end 70 of the rod 66 prevents the guide wing 42 or 44 from pivoting on the hinge 36 or 38. Once the tongue 78 contacts the hitch post 32 (or spacer 18), it is aligned with the hitch ball 54. The vehicle operator can then crank the trailer tongue 78 down so that the tongue cup is coupled to the hitch ball 54. Thus, the guide wings 42 and 44 assist the vehicle operator in aligning the trailer to the hitch assembly 10.

Once the trailer is coupled to the hitch assembly 10 the guide wings 42 and 44 would prevent the towed vehicle from turning as the towing vehicle pulls the trailer when they are in the V-guide position. To overcome this problem, the vehicle operator grasps the handle 68 and pushes the rod 66 against the bias of the spring 64 so that the end 70 of the rod 66 moves into the tube 60. Once the end 70 of the rod 66 clears the post 32, the guide wing 42 is allowed to pivot on the hinge 36 to a parallel position with the back bumper of the vehicle 12. The operator then releases the handle 66 so that the spring 64 pushes the end 70 of the rod 66 into an opening 76 in the hitch post 32, as shown in FIGS. 3 and 4. In this position, the guide wings 42 and 44 are in their retracted position and do not interfere with the turning of the trailer. FIG. 6 shows the hitch assembly 10 and the trailer tongue 78 in this position.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A hitch assembly comprising:
   a base plate;
   a hitch post mounted to the base plate;
   a first guide wing pivotally mounted to one side of the hitch post, said first guide wing including a first slide mechanism; and
   a second guide wing pivotally mounted to an opposing side of the hitch post, said second guide wing including a second slide mechanism, wherein the first and second slide mechanisms include a slideable member that is slidably positionable along a length of the guide wing to secure the guide wings in a V-guide position and in a retracted position.

2. The hitch assembly according to claim 1 wherein the first and second guide wings are L-shaped members including a front plate and a base plate.

3. The hitch assembly according to claim 1 wherein the first and second slide mechanisms each include a spring and a tube, and wherein the slideable member and the spring are positioned within the tube.

4. The hitch assembly according to claim 3 wherein the first and second slide mechanisms include a handle mounted to the slideable member, and wherein the handle extends through a slot in the tube.

5. The hitch assembly according to claim 1 wherein an end of the slideable member of each slide mechanism is positioned behind the hitch post opposite to a hitch ball when the guide wings are in the V-guide position, and the end of the slideable member of each slide mechanism is positioned within an opening in the hitch post when the guide wings are in the retracted position.

6. The hitch assembly according to claim 1 further comprising a mounting member mounted to the base plate, said mounting member being selectively positionable within a hitch receiver.

7. The hitch assembly according to claim 6 wherein the mounting member includes a series of aligned openings that allow the hitch assembly to be secured to the hitch receiver at different locations.

8. The hitch assembly according to claim 1 further comprising a hitch ball mounted to the base plate proximate to the hitch post.

9. The hitch assembly according to claim 8 wherein the hitch ball is removably coupled to the base plate.

10. The hitch assembly according to claim 9 wherein the hitch ball is bolted to the base plate.

11. The hitch assembly according to claim 1 further comprising a spacer removably mounted to a rear-ward facing wall of the hitch post.

12. The hitch assembly according to claim 1 wherein the base plate, the hitch post, the first guide wing and the second wing are all made of steel.

13. A hitch assembly comprising:
    a base plate;
    a hitch post mounted to the base plate;
    a hitch ball mounted to the base plate;
    a mounting member mounted to the base plate, said mounting member being selectively positionable within a hitch receiver;
    a first guide wing pivotally mounted to one side of the hitch post, said first guide wing including a first slide mechanism, said first slide mechanism including a first tube having a slot formed therein, said first slide mechanism further including a first spring and a first slideable rod positioned within the first tube, said first slide mechanism further including a handle rigidly attached to the slideable rod and extending through the slot in the first tube; and
    a second guide wing pivotally mounted to an opposing side of the hitch post, said second guide wing including a second slide mechanism, said second slide mechanism including a second tube having a slot formed therein, said second slide mechanism further including a second spring and a second slideable rod positioned within the second tube, said second slide mechanism further including a second handle rigidly secured to the second slideable rod and extending through the slot in the second tube, wherein an end of the first and second slideable rods is positioned behind the hitch post opposite to the hitch ball when the first and second guide wings are in a V-guide position, and the ends of the first and second slideable rods are positioned within corresponding openings in the hitch post when the first and second guide wings are in a retracted position.

14. The hitch assembly according to claim 13 wherein the first and second guide wings are L-shaped members including a front plate and a base plate.

15. The hitch assembly according to claim 13 wherein the mounting member includes a series of aligned openings that allow the hitch assembly to be secured to the hitch receiver at different locations.

16. The hitch assembly according to claim 13 wherein the hitch ball is removably coupled to the base plate.

17. The hitch assembly according to claim 16 wherein the hitch ball is bolted to the base plate.

18. The hitch assembly according to claim 13 wherein the base plate, the hitch post, the first guide wing and the second wing are all made of steel.

19. A hitch assembly for assisting a vehicle operator in aligning a trailer tongue to a hitch ball on the hitch assembly, said hitch assembly comprising a first guide wing and a second guide wing pivotally mounted to the hitch assembly, said first and second guide wings each including a locking mechanism for locking the first and second guide wings in a first locked position where the first and second guide wings define a V-shape operable to direct the trailer tongue to the hitch ball and a second locked position where the first and second guide wings are substantially in line with each other, wherein each locking mechanism includes a tube, a spring, a rod and a handle, and wherein the spring and the rod are positioned in the tube, the handle is rigidly coupled to the rod and extends through a slot in the tube, and an end of the rod extends out of an end of the tube.

20. The hitch assembly according to claim 19 further comprising a hitch post positioned proximate to the hitch ball and a spacer removably mounted to a wall of the hitch post facing the hitch ball.

* * * * *